(12) United States Patent
Huang et al.

(10) Patent No.: US 11,176,110 B2
(45) Date of Patent: Nov. 16, 2021

(54) DATA UPDATING METHOD AND DEVICE FOR A DISTRIBUTED DATABASE SYSTEM

(71) Applicant: HANGZHOU HIKVISION DIGITAL TECHNOLOGY CO., LTD., Zhejiang (CN)

(72) Inventors: Huadong Huang, Zhejiang (CN); Wei Wang, Zhejiang (CN); Qiqian Lin, Zhejiang (CN)

(73) Assignee: HANGZHOU HIKVISION DIGITAL TECHNOLOGY CO., LTD., Zhejiang (CN)

( * ) Notice: Subject to any disclaimer, the term of this patent is extended or adjusted under 35 U.S.C. 154(b) by 364 days.

(21) Appl. No.: 16/089,949

(22) PCT Filed: Nov. 4, 2016

(86) PCT No.: PCT/CN2016/104690
§ 371 (c)(1),
(2) Date: Sep. 28, 2018

(87) PCT Pub. No.: WO2017/166815
PCT Pub. Date: Oct. 5, 2017

(65) Prior Publication Data
US 2019/0121793 A1    Apr. 25, 2019

(30) Foreign Application Priority Data
Mar. 30, 2016 (CN) .......................... 201610191763.8

(51) Int. Cl.
*G06F 16/21* (2019.01)
*G06F 16/18* (2019.01)
(Continued)

(52) U.S. Cl.
CPC ........ *G06F 16/219* (2019.01); *G06F 16/1873* (2019.01); *G06F 16/2255* (2019.01);
(Continued)

(58) Field of Classification Search
CPC ............... G06F 16/219; G06F 16/1873; G06F 16/2255; G06F 16/275; G06F 16/278; G06F 16/184
(Continued)

(56) References Cited

U.S. PATENT DOCUMENTS

| | | | |
|---|---|---|---|
| 5,924,096 | A | 7/1999 | Draper et al. |
| 6,581,075 | B1 | 6/2003 | Guturu et al. |

(Continued)

FOREIGN PATENT DOCUMENTS

| | | | |
|---|---|---|---|
| CN | 101369923 | A | 2/2009 |
| CN | 101464895 | A * | 6/2009 |

(Continued)

OTHER PUBLICATIONS

Extended European Search Report issued in EP 16896584.6, dated Nov. 30, 2018.
(Continued)

*Primary Examiner* — Hosain T Alam
*Assistant Examiner* — Robert F May
(74) *Attorney, Agent, or Firm* — Meunier Carlin & Curfman LLC

(57) ABSTRACT

A method and an apparatus for updating data for a distributed database system are disclosed. The method includes: obtaining a data table stored in each of servers in the distributed database system, and for each obtained data table, reading each row of data in this obtained data table (S101); determining, for each row of data read, whether a key for this row of data exists in the hash table stored in the server (S102); if the key for this row of data does not exist in the hash table, writing the row of data into the hash table, and writing the key and version information for the row of data into the hash table (S105); if the key for this row of data exists in the hash table, reading a first version number of the
(Continued)

row of data in the data table, and determining whether the first version number is greater than a second version number for the row of data stored in the hash table (S103); if the first version number is greater than the second version number, updating the row of data into the hash table and updating version information for the row of data (S104); sending the hash table to a master server so as to cause each of servers in the distributed database system to perform data recovery based on the hash table received by the master server (S106). The method can recover the latest data in a distributed database system.

12 Claims, 3 Drawing Sheets

(51) Int. Cl.
G06F 16/22 (2019.01)
*G06F 16/27* (2019.01)
*G06F 16/182* (2019.01)

(52) U.S. Cl.
CPC .......... *G06F 16/184* (2019.01); *G06F 16/275* (2019.01); *G06F 16/278* (2019.01)

(58) Field of Classification Search
USPC ........................................................ 707/695
See application file for complete search history.

(56) References Cited

U.S. PATENT DOCUMENTS

| 8,095,516 | B2* | 1/2012 | Margolus | G06F 16/2358 |
| | | | | 707/689 |
| 2006/0047658 | A1* | 3/2006 | Baird | G06F 21/62 |
| 2006/0212465 | A1* | 9/2006 | Fish | G06F 11/2097 |
| 2009/0144220 | A1* | 6/2009 | Feng | G06F 16/2255 |
| 2010/0138389 | A1* | 6/2010 | Snapp | G06F 16/27 |
| | | | | 707/638 |
| 2012/0254140 | A1 | 10/2012 | Srinivasaraghavan et al. | |
| 2013/0110894 | A1* | 5/2013 | Beaverson | G06F 16/137 |
| | | | | 707/827 |
| 2013/0268567 | A1* | 10/2013 | Adjei-Banin | G06F 16/283 |
| | | | | 707/812 |
| 2013/0325808 | A1 | 12/2013 | Bachar et al. | |
| 2014/0229455 | A1* | 8/2014 | Bestler | G06F 16/22 |
| | | | | 707/695 |
| 2014/0351213 | A1 | 11/2014 | Rundle et al. | |
| 2015/0120675 | A1 | 4/2015 | Mason et al. | |
| 2016/0070726 | A1* | 3/2016 | Macnicol | G06F 3/065 |
| | | | | 707/691 |

FOREIGN PATENT DOCUMENTS

| CN | 101464895 A | 6/2009 |
| CN | 102426611 A | 4/2012 |
| CN | 104899257 A | 9/2015 |
| EP | 2806355 A1 | 11/2014 |
| WO | 2015108922 A1 | 7/2015 |

OTHER PUBLICATIONS

International Search Report and Written Opinion issued by the International Searching Authority/State Intellectual Property Office of the P.R. China. Application No. PCT/CN2016/104690. dated Jan. 25, 2017. 9 pages, including English translation of the International Search Report.
201610191763.8 Chinese First Office Action dated May 13, 2019 by CNIPA.

* cited by examiner

DATA UPDATING METHOD AND DEVICE FOR A DISTRIBUTED DATABASE SYSTEM

The present application claims the priority to a Chinese Patent Application No. 201610191763.8, filed with the China National Intellectual Property Administration on Mar. 30, 2016 and entitled "DATA UPDATING METHOD AND DEVICE FOR A DISTRIBUTED DATABASE SYSTEM", which is incorporated herein by reference in its entirety.

TECHNICAL FIELD

The present application relates to the technical field of data processing, and in particular, to a method and apparatus for updating data for a distributed database system.

BACKGROUND

With the popularity of computer technology, a lot of important data is stored in electronic devices. With the extensive use of electronic devices, the higher performance of electronic devices is required. A distributed database system can effectively spread the pressure of database service on a single computer device, improve the overall performance of database service, and bring better data security guarantee.

Through the establishment of multiple database servers, a distributed database system improves the overall read and write performance of the database system, provides technical support for high concurrent read and write database applications, and has been widely used in large interactive websites, banks and other backgrounds.

Since each of database servers in a distributed database system stores data, it is necessary to ensure the consistency of the data stored in the database servers. However, in the event of system exceptions, unexpected power outages, etc., data inconsistency in the database servers may occur. Therefore, it is necessary to recover the latest complete data from the distributed database system.

SUMMARY

It is an object of embodiments of the present application to provide a method and apparatus for updating data for a distributed database system to recover the latest data in the distributed database system. The specific technical solutions are as follows.

In a first aspect, an embodiment of the present application provides a method for updating data for a distributed database system, which is applicable to a server in the distributed database system which stores a hash table, wherein the hash table stores a key for each row of data in a data table and version information of this row of data, and the method includes:

obtaining a data table stored in each of servers in the distributed database system, and for each obtained data table, reading each row of data in this obtained data table;

determining, for each row of data read, whether a key for this row of data exists in the hash table stored in the server;

if the key for this row of data exists in the hash table stored in the server, reading a first version number of the row of data in the data table, and determining whether the first version number is greater than a second version number for the row of data stored in the hash table; if the first version number is greater than the second version number, updating the row of data into the hash table and updating the version information for the row of data;

if the key for this row of data does not exist in the hash table stored in the server, writing the row of data into the hash table, and writing the key and version information for the row of data into the hash table;

sending the hash table to a master server so as to cause each of servers in the distributed database system to perform data recovery based on the hash table received by the master server.

Further, for each obtained data table, reading each row of data in this obtained data table, includes:

for each obtained data table, reading each row of data in this obtained data table by means of data fragmentation.

Further, writing the key for the row of data into the hash table includes:

writing a primary key of the row of data in the data table into the hash table as a key for the row of data.

Further, after writing the row of data into the hash table, the method further includes:

recording the number of occurrences of the row of data in the hash table.

Further, when it is determined that the first version number is equal to the second version number, the method further includes:

increasing the number of occurrences of the row of data in the hash table by one.

Further, before sending the hash table to a master server, the method further includes:

for each row of data in the hash table, determining whether the number of occurrences of this row of data is less than a predetermined threshold, and if the number of occurrences is less than the predetermined threshold, deleting this row of data.

In a second aspect, an embodiment of the present application provides an apparatus for updating data for a distributed database system, which is applicable to a server in the distributed database system which stores a hash table, wherein the hash table stores a key for each row of data in a data table and version information of this row of data, and the apparatus includes:

an obtaining module, configured for obtaining a data table stored in each of servers in the distributed database system, and for each obtained data table, reading each row of data in this obtained data table;

a determining module, configured for determining, for each row of data read, whether a key for this row of data exists in the hash table stored in the server;

a first processing module, configured for when the determining module determines that the key for this row of data exists in the hash table stored in the server, reading a first version number of the row of data in the data table, and determining whether the first version number is greater than a second version number for the row of data stored in the hash table; if the first version number is greater than the second version number, updating the row of data into the hash table and updating the version information for the row of data;

a second processing module, configured for when the determining module determines that the key for this row of data does not exist in the hash table stored in the server, writing the row of data into the hash table, and writing the key and version information for the row of data into the hash table;

a sending module, configured for sending the hash table to a master server so as to cause each of servers in the distributed database system to perform data recovery based on the hash table received by the master server.

Further, the obtaining module is further configured for, for each obtained data table, reading each row of data in this obtained data table by means of data fragmentation.

Further, the second processing module is further configured for writing a primary key of the row of data in the data table into the hash table as a key for the row of data.

Further, the apparatus further includes:

a recording module, configured for recording the number of occurrences of the row of data in the hash table after the first processing module or the second processing module writes the row of data into the hash table.

Further, the apparatus further includes:

an execution module, configured for: when the first processing module determines that the first version number is equal to the second version number, increasing the number of occurrences of the row of data in the hash table by one.

Further, the apparatus further includes:

a deleting module, configured for, before the sending module sends the hash table to the master server, determining, for each row of data in the hash table, whether the number of occurrences of this row of data is less than a predetermined threshold, and if the number of occurrences is less than the predetermined threshold, deleting this row of data.

In a third aspect, the application provides a storage medium for storing an executable program code which, when executed, performs a method for updating data for a distributed database system described in the present application.

In a fourth aspect, the application provides an application which, when executed, performs a method for updating data for a distributed database system described in the present application.

In a fifth aspect, the application provides an electronic device, including:

a processor, a memory, a communication interface and a bus;

wherein the processor, the memory and the communication interface connect and communicate with each other via the bus;

the memory stores an executable program code;

the processor executes a program corresponding to the executable program code stored in the memory by reading the executable program code to perform a method for updating data for a distributed database system described in the present application.

The embodiments of the present application provide a method and apparatus for updating data for a distributed database system, which is applicable to a server in the distributed database system which stores a hash table. The method includes: obtaining a data table stored in each of servers in the distributed database system, and for each obtained data table, reading each row of data in this obtained data table; determining, for each row of data read, whether a key for this row of data exists in the hash table stored in the server; if the key for this row of data exists in the hash table stored in the server, reading a first version number of the row of data in the data table, and determining whether the first version number is greater than a second version number for the row of data stored in the hash table; if the first version number is greater than the second version number, updating the row of data into the hash table and updating the version information for the row of data; if the key for this row of data does not exist in the hash table stored in the server, writing the row of data into the hash table, and writing the key and version information for the row of data into the hash table; and sending the hash table to a master server so as to cause each of servers in the distributed database system to perform data recovery based on the hash table received by the master server. In the embodiments of the present application, a hash table including latest complete data in the distributed database system can be built based on a data table in each server in the distributed database system, and the hash table can be sent to the master server, so as to cause each server in the distributed database system to perform data recovery based on the hash table received by the master server. Therefore, it is possible to recover the latest complete data in the distributed database system for each server.

BRIEF DESCRIPTION OF THE DRAWINGS

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION

In order to enable those skilled in the art to better understand the technical solutions in the embodiments of the present application, the technical solutions in the embodiments of the present application are clearly and completely described below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

It should be noted that the embodiments in the present application and the features in the embodiments may be combined with each other without conflict. The present application will be described in detail below in combination with embodiments with reference to the accompanying drawings.

Figure 1:
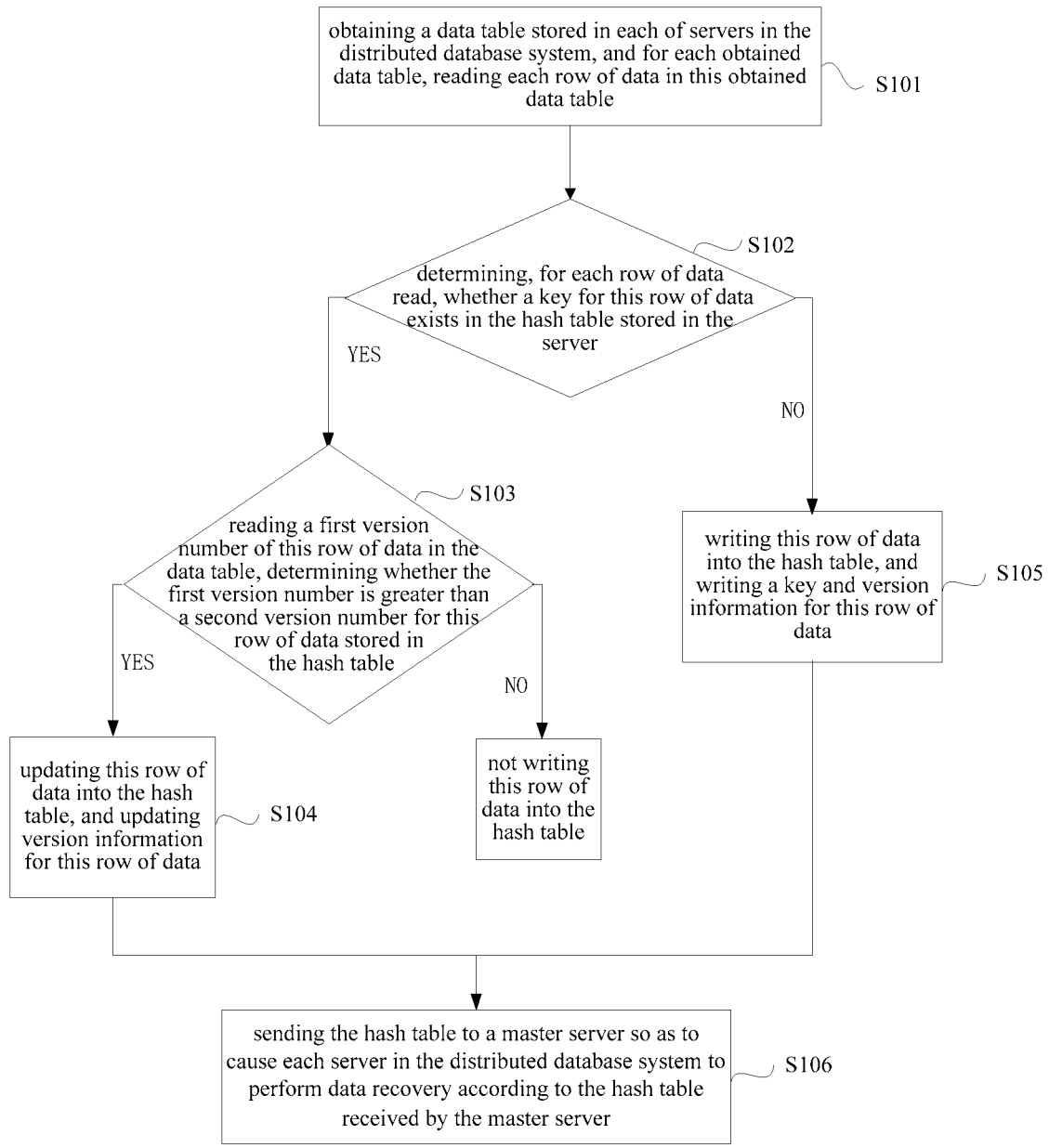
FIG. 1 is a flowchart of a method for updating data for a distributed database system according to an embodiment of the present application.

In order to recover the latest data in the distributed database system, an embodiment of the present application provides a method for updating data for a distributed database system. As shown in FIG. 1, the method includes the following operations.

S101, obtaining a data table stored in each of servers in the distributed database system, and for each obtained data table, reading each row of data in this obtained data table.

The method is applicable to a server in a distributed database system which stores a hash table. The server may be any server in the distributed database system. For convenience of description, in the embodiments of the present application, a server that stores a hash table may be referred to as a target server.

Hash table is a data structure that is accessed directly based on a key value. That is, a record is accessed by mapping a key value to a location in the table for fast lookup. The keys are different from each other in the hash table. It is possible to find the specified key value in the hash table through a limited number of steps. The lookup of the hash table takes a constant time, and thus the search efficiency is very high.

In the embodiments of the present application, in order to recover the latest data in the distributed database system, one hash table may be built in the memory of the target server of the distributed database system to store in the hash table the latest complete data in the distributed database system. For example, the target server can access each server in the distributed database system to obtain data in the data table in the each server, and compare these data and obtain the latest complete data in the distributed database system stored in the hash table.

A data table is a very important object in a server. It is a basis for other objects, and is a carrier for holding fields, keywords, primary keys, and so on. Depending on the classification of the information, a server may contain several data tables. Each row in a data table can be referred as a "record", which contains all the information in that row. Each column in a data table is referred as a field, which has corresponding description information, such as data type, data width, and so on. A primary key is one or more fields in the data table. The value of the primary key is used to uniquely identify a record in the table. The primary key does not repeat in the data table. A struct is a collection of data consisting of a series of data of the same type or different types, called a structure. An object of a struct type contains such data of the same type or different types.

In the embodiments of the present application, the key of a hash table in a target server may be defined as the primary key of a data row in a data table, and the key value of the hash table is defined as the struct composed of all the fields of the data row.

In the embodiments of the present application, in order to store the latest complete data in the distributed database system in the hash table, the target server may first obtain a data table stored in each of servers in the distributed database system, and for each obtained data table, read each row of data in this data table, so as to store some or all of these data to a hash table to obtain the latest complete data in the distributed database system.

Specifically, the target server may sequentially obtain the data table stored in each of servers in the distributed database system, and for each obtained data table, simultaneously read all rows of data in this data table.

Optionally, in practical applications, a data table may be relatively large, for example a data table may have 1 million rows of data. Therefore, simultaneously reading all rows of data in the data table may take a long time (for example, it takes about 40 seconds for mysql to read 1 million rows of data). If one row of data is read at a time, when the amount of data in the data table is large, the reading of all data in the data table can be very time consuming. For example, it may take about 4 minutes to read 1 million rows of data.

Therefore, in the embodiments of the present application, each row of data in each data table may be read by means of data fragmentation.

When the amount of data in the data table is large, it is impossible to read all the data in the data table at a time. The data fragmentation means that the partial data of the data table is read at a time, and after multiple reading operations, the complete data in the data table is finally read.

Specifically, for each data table, the fragment size may be determined according to the structural complexity of the data table. A fixed number of rows (such as 10,000 rows, 20,000 rows, 30,000 rows, etc.) of fragmented data are read at a time, until all the data in the data table are completely read.

The data reading efficiency of a data table can be improved by reading data in the data table by means of data fragmentation.

S102, for each row of data read, determining whether a key for this row of data exists in a hash table stored in the target server; if so, performing step S103; if not, performing step S105.

After reading each row of data in each data table, the target server may determine, for each row of data read, whether a key for this row of data exists in a hash table stored therein.

It is understood that, under normal circumstances, the data stored in the data tables of all the server in the distributed database system should be the same. Therefore, for a row of data in a data table, the target server may write this row of data into the hash table from the data tables of other servers. In the process of storing the latest complete data in the distributed database system in the hash table, the same data only needs to be stored once in the hash table.

Therefore, in the embodiments of the present application, the target server may determine, for each row of data obtained, whether a key for this row of data exists in the hash table stored in the target server, to determine whether this row of data has been stored in the hash table.

Specifically, the target server may search keys of all rows of data in the hash table stored therein to determine whether a key identical to the primary key of the row of data in the data table exists. If so, the target server determines that a key for the row of data exists in the hash table stored therein. If not, the target server determines that a key for the row of data does not exist in the hash table stored therein.

S103, when a key for the row of data exists in the hash table stored in the target server, reading a first version number of the row of data in the data table, and determining whether the first version number is greater than a second version number for the row of data stored in the hash table; if so, performing S104 to update the row of data into the hash table and version information for the row of data; if not, not writing the row of data into the hash table.

When the target server determines that a key for the row of data exists in the hash table stored therein, it may be indicated that the row of data has been stored in the hash table. However, it is not determined that the row of data stored in the hash table is the same as the row of data in the data table only based on the key for the row of data existing in the hash table, because when any row of data in the data table of each server is updated, a primary key of this row of data does not change.

Therefore, in the embodiments of the present application, a version number for each row of data may be stored in a data table of each server to identify the number of updating this row of data. Also, version information for each row of data is also stored in the hash table. Specifically, version information for each row of data stored in the hash table may be a version number of this row of data in the data table when this row of data is written into the hash table.

When the target server determines that the row of data has been stored in the hash table, it may further read a first version number of the row of data in the data table, and determine whether the first version number is greater than a second version number for the row of data stored in the hash table.

When the first version number is greater than the second version number, it may be indicated that the row of data stored in the data table is the latest data. In this case, the row of data may be updated into the hash table.

When the first version number is less than or equal to the second version number, it may be indicated that the row of data stored in the hash table is already the latest data. In this case, the row of data in the data table may not be written into the hash table.

S104, updating the row of data into the hash table, and updating version information for the row of data.

When the target server determines that the first version number is greater than the second version number, the row of data may be updated into the hash table, and the version information for the row of data is updated.

Specifically, the row of data in the hash table may be replaced with the row of data in the data table, the version number of the row of data in the data table is updated into the hash table as the version number for the row of data in the hash table.

S105, when a key for the row of data does not exist in the hash table stored in the target server, writing the row of data into the hash table together with the key and the version information for the row of data.

When the target server determines that the key for the row of data does not exist in the hash table stored therein, it may be indicated that the row of data is not stored in the hash table. In this case, the row of data may be written into the hash table together with the key and the version information for the row of data.

Specifically, in order to write the key for the row of data, the primary key of the row of data in the data table may be written into the hash table as a key for the row of data in the hash table.

S106, sending the hash table to a master server, so as to cause each server in the distributed database system to perform data recovery based on the hash table received by the master server.

By performing the above operations S101-S105, the latest complete data in the distributed database system can be stored in the hash table of the target server. Finally, in order to store the latest complete data in each server to ensure the consistency of data in all the servers, the target database may send the hash table to the master server, so as to cause each server in the distributed database system to perform data recovery based on the hash table received by the master server.

In a distributed database system, all servers can include one master server and other slave servers, and the slave servers can access the master server to update their data table based on a data table in the master server.

Therefore, in the present embodiment, the target server can send the hash table to the master server. After storing the hash table, the master server can recover the latest data in its data table based on the hash table. The slave servers can then synchronize the latest data according to the master server, so that the data stored in each server is the latest complete data in the distributed database system.

In the method provided by the embodiments of the present application, a hash table including latest complete data in the distributed database system can be built based on a data table in each server in the distributed database system, and the hash table can be sent to the master server, so as to cause each server in the distributed database system to perform data recovery based on the hash table received by the master server. Therefore, it is possible to recover the latest data of the distributed database system in each server.

Further, in practical applications, under normal circumstances, the data stored in the data tables of all the servers in the distributed database system is data actively updated by the user. However, when system exceptions and security faults occur in one or several servers, some abnormal data may be added in its data table or their data tables. In this case, the abnormal data may only be stored in the data table of this server or the data tables of these several servers. If the abnormal data is written into the hash table of the target server, the abnormal data is further updated to the data table of each server. In this case, the result of data query and so on may be inaccurate.

In the embodiments of the present application, in order to ensure the accuracy of data in a data table of each server, and avoid writing abnormal data into each server, after writing one row of data in a data table of any server into the hash table, the target server may record the number of occurrences of this row of data in the hash table. For example, the number of occurrences of the row of data may be recorded as 1 to indicate that the row of data occur once in the data table.

Moreover, the number of occurrences of the row of data may be modified according to whether the row of data exists in data tables of the other servers, to indicate the number of occurrences of the row of data in all the servers, and thus whether this row of data is abnormal may be determined according to the number of occurrences.

Figure 2:
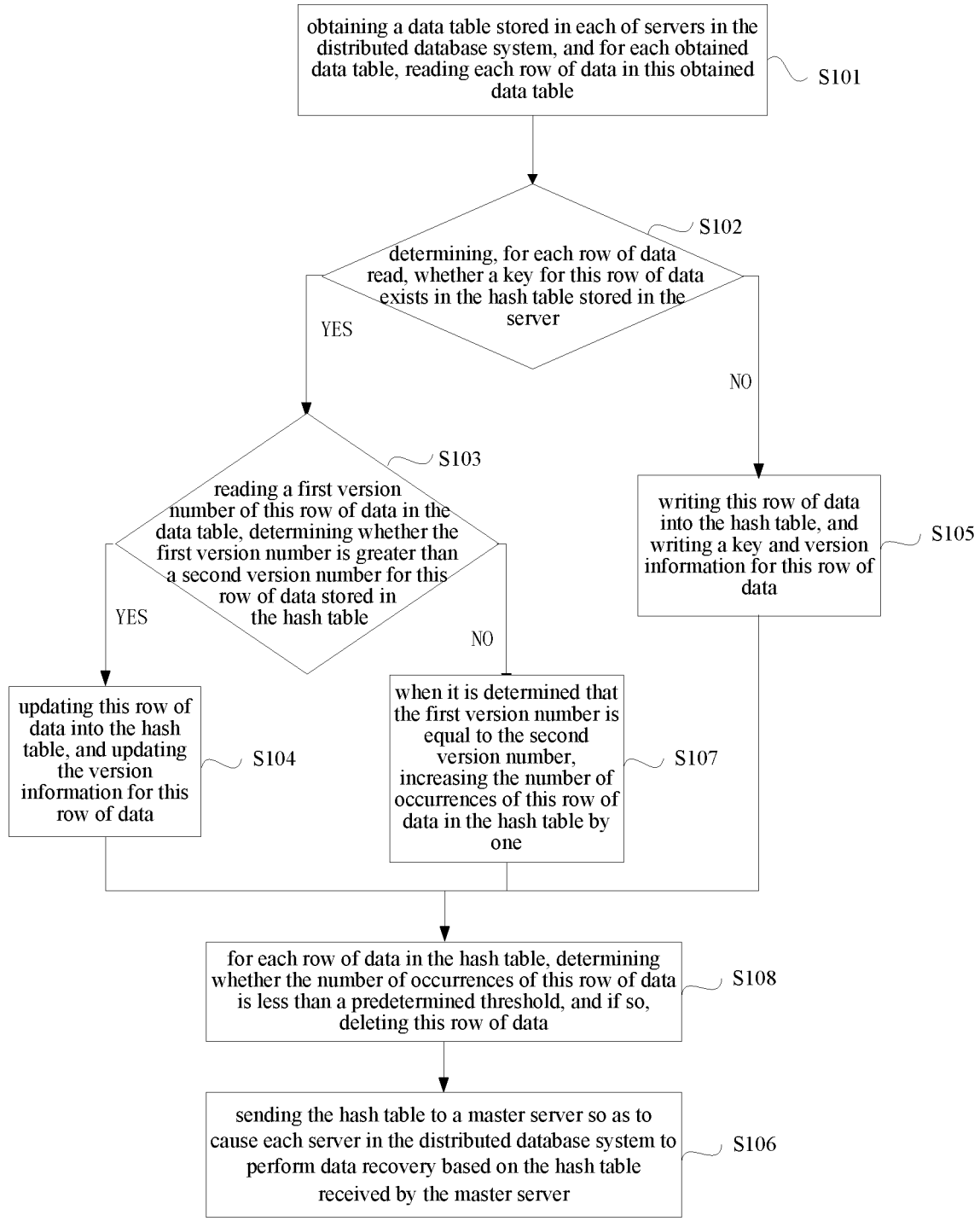
FIG. 2 is another flowchart of a method for updating data for a distributed database system according to an embodiment of the present application.

Therefore, as shown in FIG. 2, there is provided a method for updating data for a distributed database system according to an embodiment of the present application. After S103, when it is determined that the first version number is equal to the second version number, the method may further include:

S107, increasing the number of occurrences of the row of data in the hash table by one.

In the embodiments of the present application, when it is determined, for each row of data, that the first version number of this row of data in the data table is equal to the second version number for this row of data in the hash table, it is indicated that this row of data stored in the hash table is the same as this row of data in the data table. Therefore, the target server can increase the number of occurrences of this row of data in the hash table by one.

After each row of data in the data table of each server is compared with the data stored in the hash table, the number of occurrences of each row of data in the hash table is the total number of this row of data occurs in all the servers in the distributed database system.

After S104, S105 or S107 and before S106, i.e., after the data in each data table is written into the hash table and before the hash table is sent to the master server, the method provided by the embodiment of the present application may further include:

S108, for the number of occurrences of each row of data in the hash table, determining whether the number of occurrences of this row of data is less than a predetermined threshold, and if so, deleting this row of data.

In the embodiment, before sending the hash table to the master server, in order to avoid updating the abnormal data into the data table of each server, the target server may determine, for the number of occurrences of each row of data in the hash table, whether the number of occurrences of this row of data is less than a predetermined threshold, and if so, delete this row of data.

Alternatively, for different distributed database systems, the predetermined threshold may be set to the same value, such as 2, 3, 4, and the like. Alternatively, for different distributed database systems, the predetermined threshold may be determined based on the total number of servers in the system. For example, when the total number of servers is large, the predetermined threshold may be set to be a larger value (such as 3, 4, 5, etc.); when the total number of servers is small, the predetermined threshold may be set to be a smaller value (such as 1, 2, 3, etc.).

In this solution, after one row of data in a data table of any server is written into the hash table, the number of occurrences of this row of data may be recorded in the hash table. Moreover, the number of occurrences of the row of data may be modified based on whether the row of data exists in data tables of other servers, and the data whose number of occurrence is less than a predetermined threshold may be deleted before the hash table is sent to the master server. Therefore, it is possible to avoid writing abnormal data into each server, and further improve the accuracy of the data processing result.

Corresponding to the above method embodiment, the embodiments of the present application also provide an apparatus embodiment.

Figure 3:
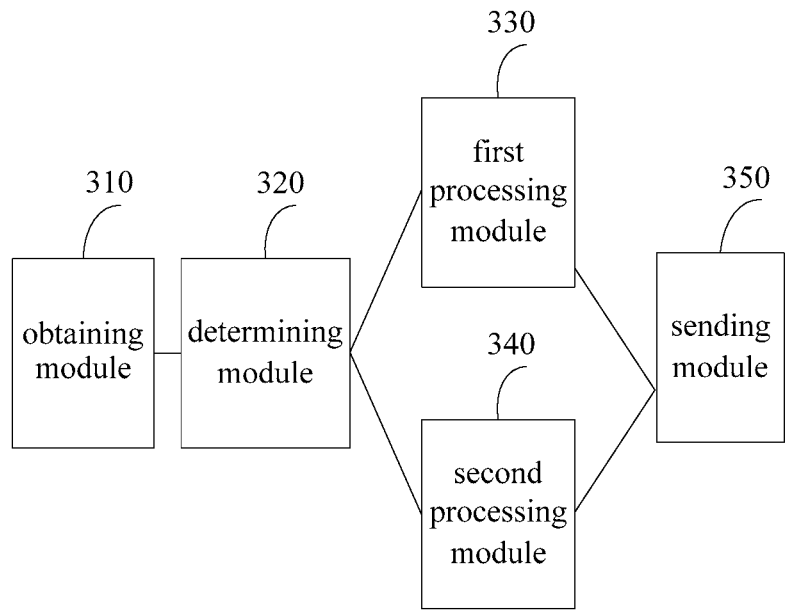
FIG. 3 is a schematic structural diagram of an apparatus for updating data for a distributed database system according to an embodiment of the present application.

FIG. 3 is an apparatus for updating data for a distributed database system provided by an embodiment of the present application, which is applicable to a server in the distributed database system which stores a hash table, wherein the hash table stores a key for each row of data in a data table and version information of this row of data, and the apparatus includes:

an obtaining module 310, configured for obtaining a data table stored in each of servers in the distributed database system, and for each obtained data table, reading each row of data in this obtained data table;

a determining module 320, configured for determining, for each row of data read, whether a key for this row of data exists in the hash table stored in the server;

a first processing module 330, configured for when the determining module determines that the key for this row of data exists in the hash table stored in the server, reading a first version number of the row of data in the data table, and determining whether the first version number is greater than a second version number for the row of data stored in the hash table; if the first version number is greater than the second version number, updating the row of data into the hash table and updating the version information for the row of data;

a second processing module 340, configured for when the determining module determines that the key for this row of data does not exist in the hash table stored in the server, writing the row of data into the hash table, and writing the key and version information for the row of data into the hash table;

a sending module 350, configured for sending the hash table to a master server so as to cause each of servers in the distributed database system to perform data recovery based on the hash table received by the master server.

In the apparatus provided by the embodiments of the present application, a hash table including latest complete data in the distributed database system can be built based on a data table in each server in the distributed database system, and the hash table can be sent to the master server, so as to cause each server in the distributed database system to perform data recovery based on the hash table received by the master server. Therefore, it is possible to recover the latest complete data of the distributed database system in each server.

Further, the obtaining module 310 is specifically configured for, for each obtained data table, reading each row of data in this obtained data table by means of data fragmentation.

Further, the second processing module 340 is specifically configured for writing a primary key of the row of data in the data table into the hash table as a key for the row of data.

Further, the apparatus further includes:

a recording module (not shown in the figure), configured for recording the number of occurrences of the row of data in the hash table after the first processing module 330 or the second processing module 340 writes the row of data into the hash table.

Figure 4:
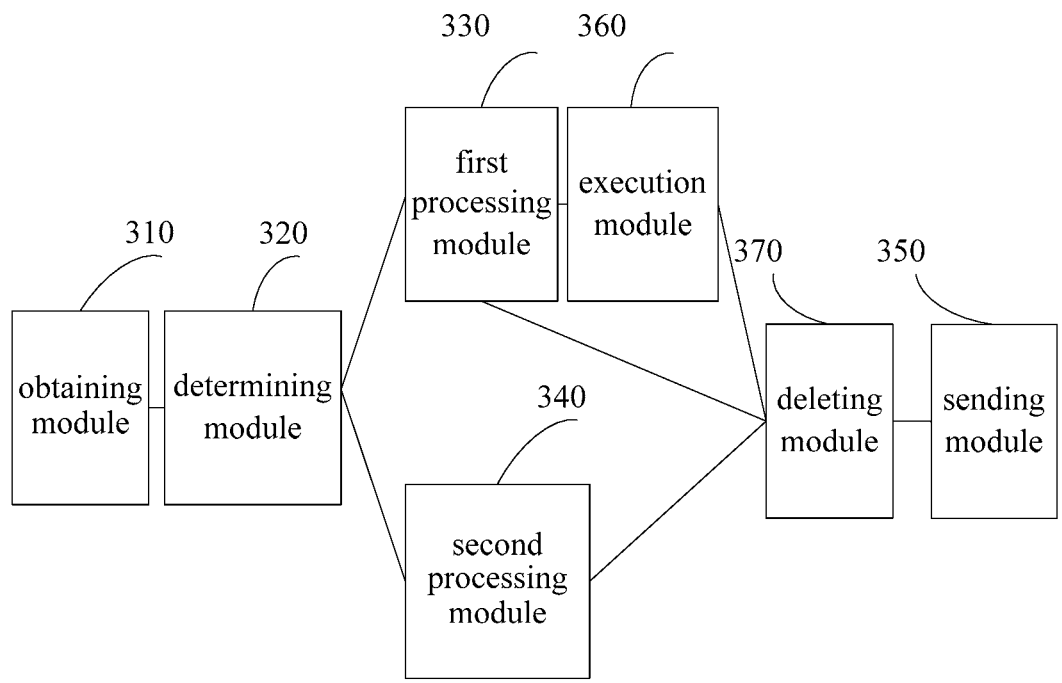
FIG. 4 is another schematic structural diagram of an apparatus for updating data for a distributed database system according to an embodiment of the present application.

Further, as shown in FIG. 4, the apparatus for updating data for a distributed database system provided by the embodiment of the present application further includes:

an execution module 360, configured for: when the first processing module 330 determines that the first version number is equal to the second version number, increasing the number of occurrences of the row of data in the hash table by one.

Further, the apparatus further includes:

a deleting module 370, configured for, before the sending module 350 sends the hash table to the master server, determining, for each row of data in the hash table, whether the number of occurrences of this row of data is less than a predetermined threshold, and if the number of occurrences is less than the predetermined threshold, deleting this row of data.

In this solution, after one row of data in the data table of any server is written into the hash table, the number of occurrences of this row of data may be recorded in the hash table. Moreover, the number of occurrences of the row of data may be modified based on whether the row of data exists in data tables of other servers, and the data whose number of occurrence is less than a predetermined threshold may be deleted before the hash table is sent to the master server. Therefore, it is possible to avoid writing abnormal data into each server, and further improve the accuracy of the data processing result.

Correspondingly, the application provides a storage medium for storing an executable program code which, when executed, performs a method for updating data for a distributed database system described in the present application. The method for updating data for a distributed database system is applicable to a server in the distributed database system which stores a hash table, wherein the hash table stores a key for each row of data in a data table and version information of this row of data, and the method includes:

obtaining a data table stored in each of servers in the distributed database system, and for each obtained data table, reading each row of data in this obtained data table;

determining, for each row of data read, whether a key for this row of data exists in the hash table stored in the server;

if the key for this row of data exists in the hash table stored in the server, reading a first version number of the row of data in the data table, and determining whether the first version number is greater than a second version number for the row of data stored in the hash table; if the first version number is greater than the second version number, updating the row of data into the hash table and updating version information for the row of data;

if the key for this row of data does not exist in the hash table stored in the server, writing the row of data into the hash table, and writing the key and version information for the row of data into the hash table; and sending the hash table to a master server so as to cause each of servers in the distributed database system to perform data recovery based on the hash table received by the master server.

In the embodiments of the present application, a hash table including latest complete data in the distributed database system can be built based on a data table in each server in the distributed database system, and the hash table can be sent to the master server, so as to cause each server in the distributed database system to perform data recovery based on the hash table received by the master server. Therefore, it is possible to recover the latest complete data of the distributed database system in each server.

Correspondingly, the application provides an application which, when executed, performs a method for updating data for a distributed database system described in the present application. The method for updating data for a distributed database system is applicable to a server in the distributed database system which stores a hash table, wherein the hash table stores a key for each row of data in a data table and version information of this row of data, and the method includes:

obtaining a data table stored in each of servers in the distributed database system, and for each obtained data table, reading each row of data in this obtained data table;

determining, for each row of data read, whether a key for this row of data exists in the hash table stored in the server;

if the key for this row of data exists in the hash table stored in the server, reading a first version number of the row of data in the data table, and determining whether the first version number is greater than a second version number for the row of data stored in the hash table; if the first version number is greater than the second version number, updating the row of data into the hash table and updating version information for the row of data;

if the key for this row of data does not exist in the hash table stored in the server, writing the row of data into the hash table, and writing the key and version information for the row of data into the hash table;

sending the hash table to a master server so as to cause each of servers in the distributed database system to perform data recovery based on the hash table received by the master server.

In the embodiments of the present application, a hash table including latest complete data in the distributed database system can be built based on a data table in each server in the distributed database system, and the hash table can be sent to the master server, so as to cause each server in the distributed database system to perform data recovery based on the hash table received by the master server. Therefore, it is possible to recover the latest complete data of the distributed database system in each server.

Correspondingly, the application provides an electronic device, including:

a processor, a memory, a communication interface and a bus;

wherein the processor, the memory and the communication interface connect and communicate with each other via the bus;

the memory stores an executable program code; and the processor executes a program corresponding to the executable program code stored in the memory by reading the executable program code to perform a method for updating data for a distributed database system described in the present application. The method for updating data for a distributed database system is applicable to a server in the distributed database system which stores a hash table, wherein the hash table stores a key for each row of data in a data table and version information of this row of data, and the method includes:

obtaining a data table stored in each of servers in the distributed database system, and for each obtained data table, reading each row of data in this obtained data table;

determining, for each row of data read, whether a key for this row of data exists in the hash table stored in the server;

if the key for this row of data exists in the hash table stored in the server, reading a first version number of the row of data in the data table, and determining whether the first version number is greater than a second version number for the row of data stored in the hash table; if the first version number is greater than the second version number, updating the row of data into the hash table and updating version information for the row of data;

if the key for this row of data does not exist in the hash table stored in the server, writing the row of data into the hash table, and writing the key and version information for the row of data into the hash table;

sending the hash table to a master server so as to cause each of servers in the distributed database system to perform data recovery based on the hash table received by the master server.

In the embodiments of the present application, a hash table including latest complete data in the distributed database system can be built based on a data table in each server in the distributed database system, and the hash table can be sent to the master server, so as to cause each server in the distributed database system to perform data recovery based on the hash table received by the master server. Therefore, it is possible to recover the latest complete data of the distributed database system in each server.

The embodiments of an apparatus, a storage medium, an application program and an electronic device are described briefly since they are substantially similar to the embodiment of the method. Related contents can refer to the part that describes the embodiment of the method.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A method for updating data for a distributed database system, wherein the distributed database system comprises a plurality of servers comprising a master server and slave servers, the method is applicable to a target server in the distributed database system, the target server is a slave server of the slave servers, which stores a hash table, wherein the hash table stores a key for each row of data in a data table and version information of this row of data, and the method comprises:
   obtaining a data table stored in each of the plurality of servers in the distributed database system, and for each obtained data table, reading each row of data in this obtained data table;
   determining, for each row of data read, whether a key for this row of data exists in the hash table stored in the target server;
   if the key for this row of data exists in the hash table stored in the target server, reading a first version number of the row of data in the data table, and determining whether the first version number is greater than a second version number for the row of data stored in the hash table;
   if the first version number is greater than the second version number, updating the row of data into the hash table and updating version information for the row of data;
   if the key for this row of data does not exist in the hash table stored in the target server, writing the row of data into the hash table, and writing the key and version information for the row of data into the hash table;
   sending the hash table to the master server so as to cause each of the plurality of servers in the distributed database system to perform data recovery based on the hash table received by the master server;
   wherein after writing the row of data into the hash table, recording the number of occurrences of the row of data in the hash table;
   wherein when it is determined that the first version number is equal to the second version number, increasing the number of occurrences of the row of data in the hash table by one; and
   wherein before sending the hash table to the master server, the method further comprises for each row of data in the hash table, determining whether the number of occurrences of this row of data is less than a predetermined threshold, and if the number of occurrences is less than the predetermined threshold, deleting this row of data.

2. The method according to claim 1, wherein, for each obtained data table, reading each row of data in this obtained data table, comprises: for each obtained data table, reading each row of data in this obtained data table by means of data fragmentation.

3. The method according to claim 1, wherein, writing the key for the row of data into the hash table comprises: writing a primary key of the row of data in the data table into the hash table as a key for the row of data.

4. An apparatus for updating data for a distributed database system, wherein the distributed database system comprises a plurality of servers comprising a master server and slave servers, the apparatus is applicable to a target server in the distributed database system, the target server is a slave server of the slave servers, which stores a hash table, wherein the hash table stores a key for each row of data in a data table and version information of this row of data, and the apparatus comprises;
   an obtaining module, configured for obtaining a data table stored in each of the plurality of servers in the distributed database system, and for each obtained data table, reading each row of data in this obtained data table;
   a determining module, configured for determining, for each row of data read, whether a key for this row of data exists in the hash table stored in the target server;
   a first processing module, configured for when the determining module determines that the key for this row of data exists in the hash table stored in the target server, reading a first version number of the row of data in the data table, and determining whether the first version number is greater than a second version number for the row of data stored in the hash table;
   if the first version number is greater than the second version number, updating the row of data into the hash table and updating version information for the row of data;
   a second processing module, configured for when the determining module determines that the key for this row of data does not exist in the hash table stored in the target server, writing the row of data into the hash table, and writing the key and version information for the row of data into the hash table;
   a sending module, configured for sending the hash table to the master server so as to cause each of the plurality of servers in the distributed database system to perform data recovery based on the hash table received by the master server;
   wherein, the apparatus further comprises:
      a recording module configured for recording the number of occurrences of the row of data in the hash table after the first processing module or the second processing module writes the row of data into the hash table;
      an execution module configured for when the first processing module determines that the first version number is equal to the second version number, increasing the number of occurrences of the row of data in the hash table by one; and
      a deleting module configured for, before the sending module sends the hash table to the master server, determining, for each row of data in the hash table whether the number of occurrences of this row of data is less than a predetermined threshold, and if the number of occurrences is less than the predetermined threshold, deleting this row of data.

5. The apparatus according to claim 4, wherein the obtaining module is further configured for, for each obtained data table, reading each row of data in this obtained data table by means of data fragmentation.

6. The apparatus according to claim 4, wherein the second processing module is further configured for writing a primary key of the row of data in the data table into the hash table as a key for the row of data.

7. A storage medium for storing an executable program code which, when executed, performs the method for updating data for a distributed database system of claim 1.

8. An electronic device, comprising: a processor, a memory, a communication interface and a bus, wherein the processor, the memory and the communication interlace connect and communicate with each other via the bus; the memory stores an executable program code; the processor executes a program corresponding to the executable program code stored in the memory by reading the executable program code to perform the method for updating data for a distributed database system of claim 1.

9. The method according to claim 2, wherein after writing the row of data into the hash table, the method further comprises: recording the number of occurrences of the row of data in the hash table.

10. The method according to claim 3, wherein after writing the row of data into the hash table, the method further comprises: recording the number of occurrences of the row of data in the hash table.

11. The apparatus of claim 5, wherein, the apparatus further comprises: a recording module, configured for recording the number of occurrences of the row of data in the hash table after the first processing module or the second processing module writes the row of data into the hash table.

12. The apparatus of claim 6, wherein, the apparatus further comprises: a recording module, configured for recording the number of occurrences of the row of data in the hash table after the first processing module or the second processing module writes the row of data into the hash table.

\* \* \* \* \*